United States Patent
El-Essawy et al.

(10) Patent No.: US 7,487,297 B2
(45) Date of Patent: Feb. 3, 2009

(54) DYNAMICALLY ADJUSTING A PRE-FETCH DISTANCE TO ENABLE JUST-IN-TIME PREFETCHING WITHIN A PROCESSING SYSTEM

(75) Inventors: Wael R. El-Essawy, Austin, TX (US); Ramakrishnan Rajamony, Austin, TX (US); Hazim Shafi, Redmond, WA (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 11/422,459

(22) Filed: Jun. 6, 2006

(65) Prior Publication Data

US 2007/0283101 A1    Dec. 6, 2007

(51) Int. Cl.
*G06F 13/00* (2006.01)
(52) U.S. Cl. .................. 711/137; 711/118; 712/237
(58) Field of Classification Search .................. 711/137, 711/118; 712/237
See application file for complete search history.

(56) References Cited

U.S. PATENT DOCUMENTS

| 7,073,030 | B2 * | 7/2006 | Azevedo et al. | 711/136 |
| 7,177,985 | B1 * | 2/2007 | Diefendorff | 711/137 |
| 2004/0215892 | A1 * | 10/2004 | Fluhr et al. | 711/137 |
| 2006/0179239 | A1 * | 8/2006 | Fluhr et al. | 711/137 |
| 2007/0106848 | A1 * | 5/2007 | Krishnaiyer et al. | 711/137 |
| 2007/0174555 | A1 * | 7/2007 | Burtscher et al. | 711/137 |

OTHER PUBLICATIONS

Ando, Ki et al. "Adaptive Data Prefetching Using Cache Information," Iinternational Comference on Supercomputing 1997, Vienna, Austria, pp. 204-212, Association for Computing Machinery, Danvers, MA, USA.
M. Dubois et al. "Sequential Hardware Prefetching In Shared-Memory Multiprocessors," IEEE Trans on Parallel and Distributed Systems, vol. 6, Issue 7, Jul. 1995, pp. 733-745.
Edward H. Gornish "Adaptive and Integrated Data Cache Prefetching For Shared-Memory Multiprocessors," Thesis Submitted in the University of Illinois as Urbana-Champaign, 1995, Urbana, Illinois.

* cited by examiner

*Primary Examiner*—Hong Kim
(74) *Attorney, Agent, or Firm*—Casimer K. Salys; Dillon & Yudell LLP

(57) ABSTRACT

A method and an apparatus for performing just-in-time data prefetching within a data processing system comprising a processor, a cache or prefetch buffer, and at least one memory storage device. The apparatus comprises a prefetch engine having means for issuing a data prefetch request for prefetching a data cache line from the memory storage device for utilization by the processor. The apparatus further comprises logic/utility for dynamically adjusting a prefetch distance between issuance by the prefetch engine of the data prefetch request and issuance by the processor of a demand (load request) targeting the data/cache line being returned by the data prefetch request, so that a next data prefetch request for a subsequent cache line completes the return of the data/cache line at effectively the same time that a demand for that subsequent data/cache line is issued by the processor.

20 Claims, 5 Drawing Sheets

DYNAMICALLY ADJUSTING A PRE-FETCH DISTANCE TO ENABLE JUST-IN-TIME PREFETCHING WITHIN A PROCESSING SYSTEM

GOVERNMENT RIGHTS

This invention was made with Government support under Agreement No. NBCH30390004 with the United States Defense Advanced Research Projects Agency (DARPA). The U.S. Government has certain rights to this invention.

BACKGROUND OF THE INVENTION

1. Technical Field

The present invention relates generally to data processing and more particularly to fetching data for utilization during data processing. Still more particularly, the present invention relates to data prefetching operations during data processing.

2. Description of Related Art

Prefetching of data for utilization within data processing operations is well-known in the art. Conventional computer systems are designed with a memory hierarchy comprising different memory devices with increasing access latency the further the device is away form the processor. These conventionally designed processors typically operate at a very high speed and are capable of processing data at such a fast rate that it is necessary to prefetch a sufficient number of cache lines of data from lower level (and/or system memory). This prefetching ensures that the data is ready and available for utilization by the processor.

Data prefetching is a proven, effective way to hide increasing memory latency from the processor's execution units. On these processors, data prefetch requests are issued as early as possible in order to "hide" the memory access latencies and thus allow ensuing dependent data operations (load requests) to execute with minimal delay in the return of data to the execution units.

If a data prefetch operation does not complete by the time the processor demands (i.e., issues a load request for) the corresponding data/cache line, the processor operations may stall as the processor waits for the data to be fetched from lower level memory. If, on the other hand, the data prefetch completes long before the processor requires the data, a window of vulnerability (between the prefetch completion and the demand for the data/cache line) exists, during which time the prefetched cache line may be replaced in the cache/prefetch buffer before the fetched cache line is demanded by the processor. This results in a stall of processor operations as the cache line has to be refetched when the demand is eventually issued.

How far ahead a prefetch request is issued is called "prefetch distance". A majority of existing/conventional prefetch algorithms utilize a fixed prefetch distance to decide when to issue data prefetches. However, in processor execution/operations, the timeliness of a data prefetch depends on not only this static prefetch distance, but also on two dynamic factors, namely (1) how soon the prefetch operation completes with current operating conditions and (2) how fast the processor consumes data. As a result, using a static prefetch distance typically will not exploit the full benefits to be gained from data prefetching and leads to the above described inefficiencies.

Researchers in the industry have proposed to augment each cache line with extra states and extra bits to dynamically increase the prefetch distance. These proposed mechanisms all share the drawbacks of introducing significant hardware overhead and not being able to detect "too early" prefetch requests. These drawbacks have prevented/hampered the proposed mechanisms from being integrated in real systems. Thus, while significant research has gone into improving the coverage and accuracy of data prefetch algorithms, to date there has been little success in providing a data prefetch mechanism/method within a processing system that produces "just-in-time" prefetches.

SUMMARY OF THE INVENTION

In accordance with an embodiment of the present invention, disclosed are a method and an apparatus for performing just-in-time data prefetching within a data processing system comprising a processor, a cache or prefetch buffer, and at least one memory storage device. The apparatus comprises a prefetch engine (PE) having means for issuing a data prefetch request for prefetching a data cache line from the memory storage device for utilization by the processor. The apparatus further comprises logic/utility for dynamically adjusting a prefetch distance between issuance by the prefetch engine of the data prefetch request and issuance by the processor of a demand (load request) targeting the data/cache line being returned by the data prefetch request, so that a next data prefetch request for a subsequent cache line completes the return of the data/cache line at effectively the same time that a demand for that subsequent data/cache line is issued by the processor.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The present invention provides a method and an apparatus for performing just-in-time data prefetching within a data processing system comprising a processor, a cache or prefetch buffer, and at least one memory storage device. The apparatus comprises a prefetch engine having means for issuing a data prefetch request for prefetching a data cache line from the memory storage device for utilization by the processor. The apparatus further comprises logic/utility for dynamically adjusting a prefetch distance between issuance by the prefetch engine of the data prefetch request and issuance by the processor of a demand (load request) targeting the data/cache line being returned by the data prefetch request, so that a next data prefetch request for a subsequent cache line completes the return of the data/cache line at effectively the same time that a demand for that subsequent data/cache line is issued by the processor.

Figure 1:
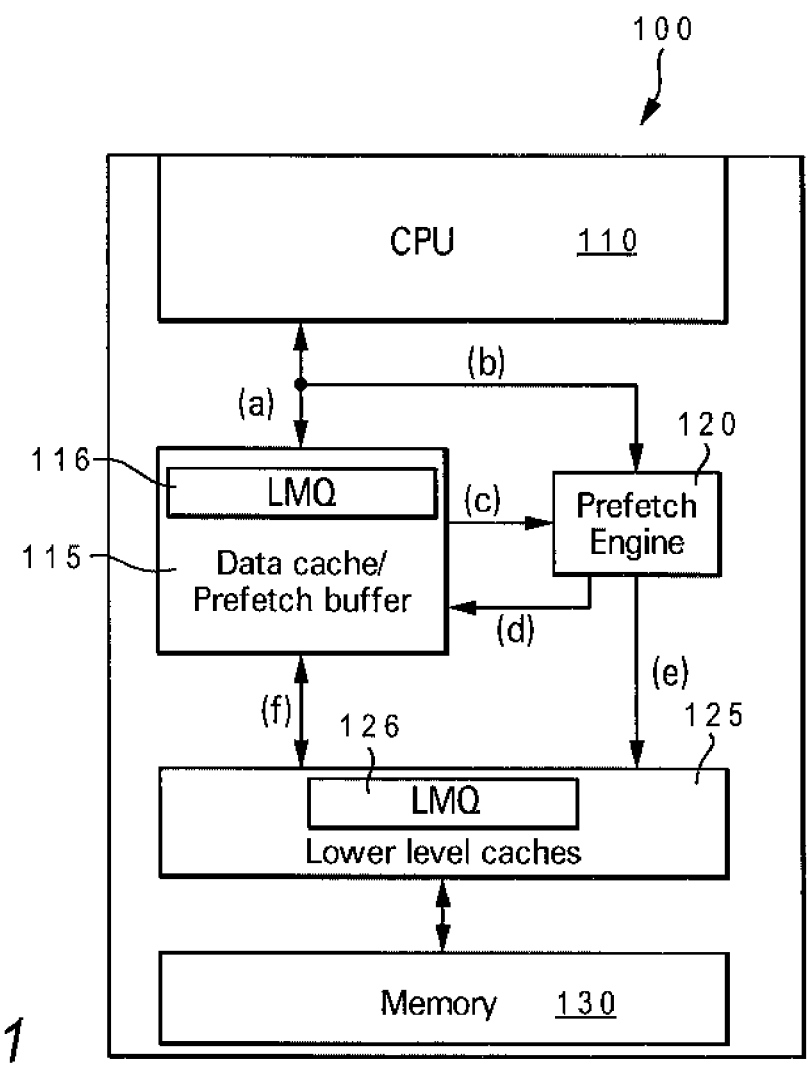
FIG. 1 is a block diagram of a data processing system with components utilized to complete a just-in-time data prefetch in accordance with one embodiment of the present invention.

Referring now to the drawings and in particular to FIG. 1, there is the depicted block diagram of a data processing system, within which the various features of the invention may be implemented, in accordance with one embodiment of the present invention. Data processing system 100 comprises at least one central processing unit (CPU) 110 which is connected via a series of buses/channels to a memory hierarchy that includes a data cache and prefetch buffer 115, lower level caches 125 and memory 130. Also illustrated coupled directly to CPU 110 is a prefetch engine (PE) 120, within which logic is provided to enable the various features of the invention, as described in details below.

Each of data cache and prefetch buffer 115 and lower level caches 125 comprise load miss queue (LMQ) 116 and 126, respectively. Load miss queues 116/126 store information for outstanding load misses sent to the lower level caches or memory 130. In the described embodiment, LMQ 116 stores load misses. However, those skilled in the art understand that the techniques of the present invention are equally applicable to store misses.

As utilized herein, the term prefetching refers to the method by which data that is stored in one memory location of the memory hierarchy (i.e., lower level caches 125 or memory 130) is transferred to a higher level memory location that is closer (yields lower access latency) to the CPU processor, before the data is actually needed/demanded by the processor. More specifically, prefetching as described hereinafter, refers to the early retrieval of data from one of the lower level caches/memory to the data cache and prefetch buffer 115 before the processor issues a demand for the specific data being returned. Lower level caches 125 may comprise a single level two (L2) cache or multiple other sequentially number lower levels, e.g., L3, L4. In addition to the illustrated memory hierarchy, data processing system 100 may also comprise additional storage devices that form a part of memory hierarchy from the perspective of CPU 110. Storage device may be one or more electronic storage media such as a floppy disk, hard drive, CD-ROM, or digital versatile disk (DVD). Storage device may also be the cache, memory, and storage media of another CPU in a multiprocessor system.

CPU 110 includes various execution units, registers, buffers, memories, and other functional units, which are all formed by integrated circuitry. In one embodiment of the present invention, CPU 110 is one of the PowerPC™ lines of microprocessors, which operates according to reduced instruction set computing (RISC) techniques. CPU 110 communicates with each of the above devices within the memory hierarchy by various means, including a bus or a direct channel. Each communication medium is labeled with an associated letter of the alphabet (a-f) and the arrows indicated the direction of request/data flow. More than one bus 120 may be provided utilizing a bus bridge or a network of buses.

Those skilled in the art will further appreciate that there are other components that might be utilized in conjunction with those shown in the block diagram of FIG. 1; for example, cache controller(s) and a memory controller may be utilized as interfaces between lower level caches 125 and memory device 130 and CPU 110, respectively. While a particular configuration of data processing system 100 is illustrated and described, it is understood that other configurations may be possible, utilizing similarly featured components within a processor to achieve the same functional results, and it is contemplated that all such configurations fall within the scope of the present invention.

Also, while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution.

Figure 2:
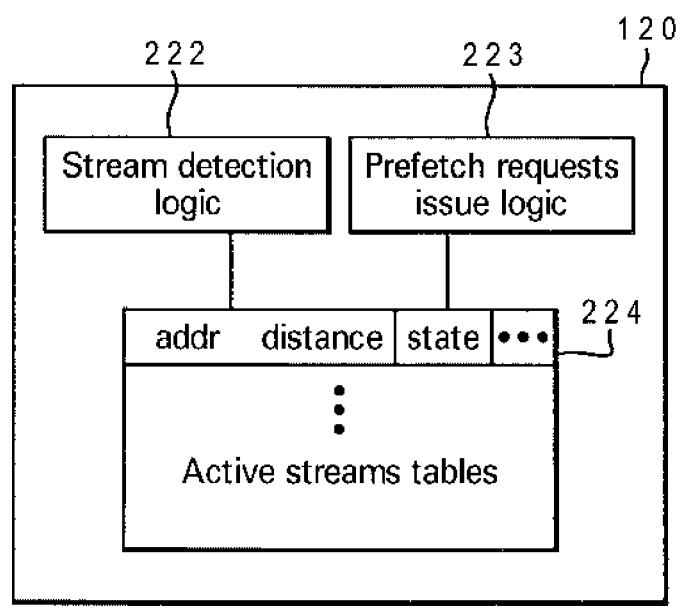
FIG. 2 is a block diagram depicting internal components of the prefetch engine in accordance with one embodiment of the present invention.

FIG. 2 is a block diagram illustrating additional logic components of an example prefetch engine (PE) 120 utilized for enabling just-in-time data prefetching according to the illustrative embodiment of the present invention. In the depicted embodiment, PE 120 comprises logic 222 for dynamically determining what prefetch requests to issue and logic 223 for dynamically adjusting the time at which the prefetch requests are issued based on current operating conditions of the processor, prefetch return latency, and other parameters, as is further described below. In one embodiment, special counters/registers in the active streams table 224 are maintained in PE 120 and utilized to track when to adjust the prefetch distance, as described below in the description of FIGS. 4A and 4B. During operation, the PE 120 monitors all read/write requests, receives hit/miss information from the data cache/prefetch buffer 115, and generates prefetch requests based on certain rules.

The present invention provides enhanced logic 223 within PE 120 that enables PE 120 to dynamically adjust the prefetch distance for data prefetch. The logic 223 utilizes a set of hardware registers in the active streams table 224. The logic 223 operates along with prefetch logic 222 to trigger calculated, timed issuance of data prefetch requests so that the data prefetch operation completes (i.e., returns the fetched cache line to the data cache and prefetch buffer 115) at effectively the time (or clock cycle) at which the processor issues a demand for the returned cache line data. The functionality provided by the invention enables the data prefetch mechanisms within PE 120 to adapt quickly to changes in current operating conditions within the CPU 110 (e.g., speed of processing data) so that the data prefetch does not complete too early or too late during the next prefetch operation.

As previously mentioned, implementation of the invention involves the utilization of additional logic in 223 and 224 (i.e., hardware and software enabled structures) within the PE 120 to (1) monitor spacing between completion of an issued data prefetch and receipt of the processor demand for the data and (2) make the dynamic adjustments to the prefetching scheme to enable just-in-time return of data to the data cache and prefetch buffer 115. The invention provides a practical mechanism that enables the prefetch distance to be dynamically increased and/or decreased, without requiring extra tag bits or extra states in caches. According to the illustrative embodiment, the PE 120 (i.e., not the cache) includes a logic (hardware registers and software-enabled utility) by which the PE keeps track of per-stream late and early prefetch requests. This logic enables the PE's just-in-time prefetching (JITP) utility to dynamically adjust the prefetch distance to the optimal distance for the controlled return of the particular data cache line.

In executing the algorithm of the JITP utility, the following parameters, presented with their respective definitions or uses, are utilized:

(1) distance: a prefetch distance, which has a fixed range of value and is prevented from going outside of the fixed range by dynamic adjustments provided by the algorithm;
(2) early_threshold: the number of minimum elapsed cycles required to consider a data prefetch early;
(3) increase_threshold: the minimum number of late prefetches recorded to start increasing "distance";
(4) decrease_threshold: the minimum number of early prefetches recorded to start decreasing "distance";
(5) step_up_size: the step size utilized when increasing the prefetch distance; and
(6) step_down_size: the step size utilized when decreasing the prefetch distance.

The specific parameters utilized within the described processes may have static values or dynamic values tailored to the underlying system. It is understood that the use of specific parameter names are for example only and not meant to imply any limitations on the invention. The invention may thus be implemented with different nomenclature/terminology utilized to described the above parameters, without limitation.

Figure 3A:
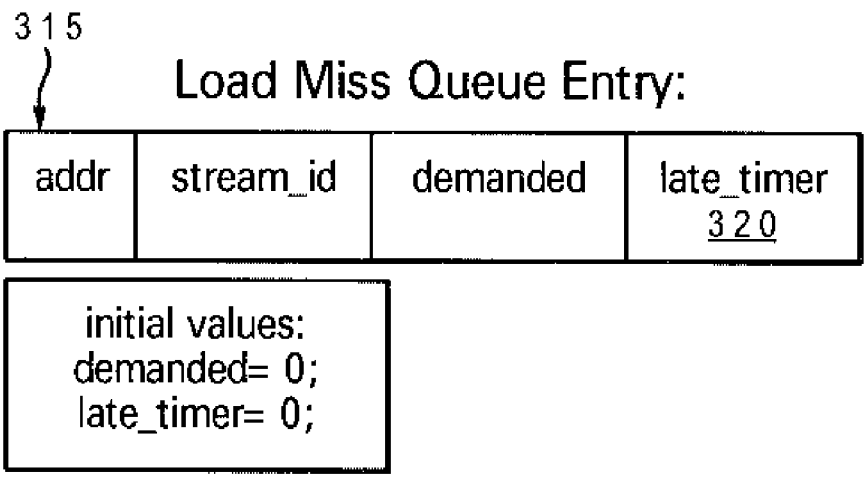
FIGS. 3A and 3B respectively illustrate a load miss queue (LMQ) entry with "late_timer" field and an example data stream control entry enhanced with two parameters utilized for just-in-time prefetching, in accordance with one embodiment of the invention.
Figure 3B:
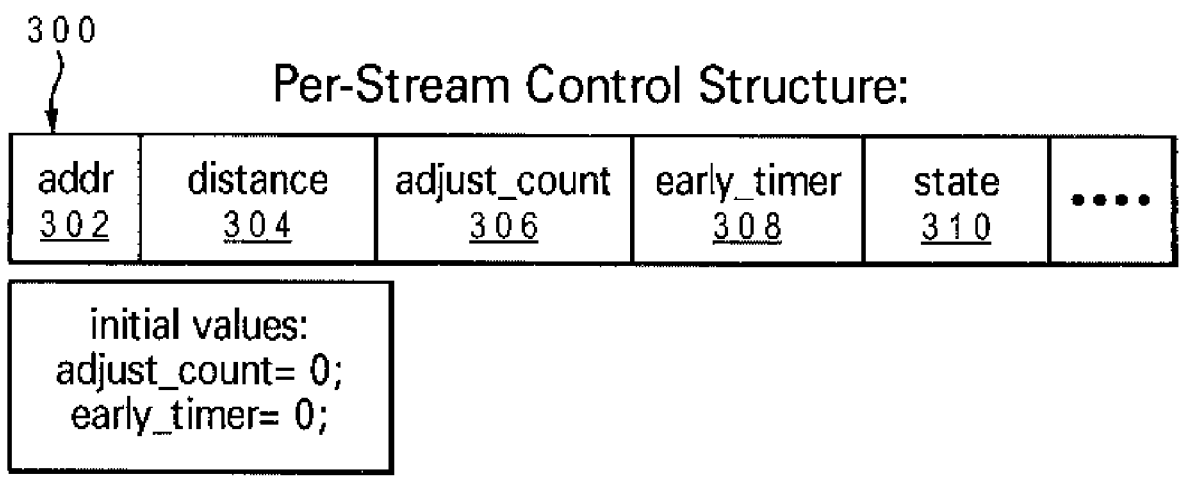

Further, in order to support execution of the just-in-time prefetch (JITP) utility and associated algorithm, two fields (register entries) are added to the control structure of each prefetch stream. These two fields are: (1) "adjust_count", which records the number of late/early prefetches for the particular stream; and (2) "early_timer", which tracks the time elapsed between return/completion of the data prefetch and when the prefetched data/cache line is demanded/requested by the processor. FIG. 3B illustrates an example prefetch stream 300 with several standard fields (register entries), namely address field 302, distance field 304 and state field 310. Also illustrated are adjust_count field 306 and early_timer field 308, added to enable the tracking features performed by the JITP utility within the PE 120.

With the adjust_count field, a zero value is preset as the desired norm for the stream, indicating that no adjustment is required to the current prefetch distance. Each late prefetch increases the value of adjust_count by a preset increment (e.g., 1) and each early prefetch decreases the value by a similar-sized preset decrement (i.e., 1). Thus, assuming a zero starting value, a positive value indicates that there are more late prefetches than early prefetches recorded for that data stream. Conversely, a negative value indicates that there are more early prefetches recorded than late prefetches.

According to one embodiment of the invention, ongoing prefetch requests are saved within the cache's load miss queue (LMQ). The LMQ is aware of when an ongoing requested prefetch is late (i.e., early returns of a prefetch are not registered within the LMQ). The LMQ is designed to track the interval between the issuance of the request until when the request completes and the cache line is returned. This interval is referred to as the lateness interval and represented herein as "late_time". The late_time interval is tracked within a field within the LMQ. FIG. 3A illustrates an example LMQ entry 315 according to the present embodiment of the invention. As shown, in addition to the standard fields, LMQ entry 315 also comprises a late_time field 320 in which the value of the late_time parameter is stored.

PE 120 tracks the intervals between return of the data prefetch and the issuance of the demand request for the fetched data. This interval provides a sense of the "earliness" of the request, as opposed to the lateness interval tracked by the LMQ. The PE 120 completes this earliness tracking on a per-stream basis without requiring any modifications to the cache tags.

Figure 4A:
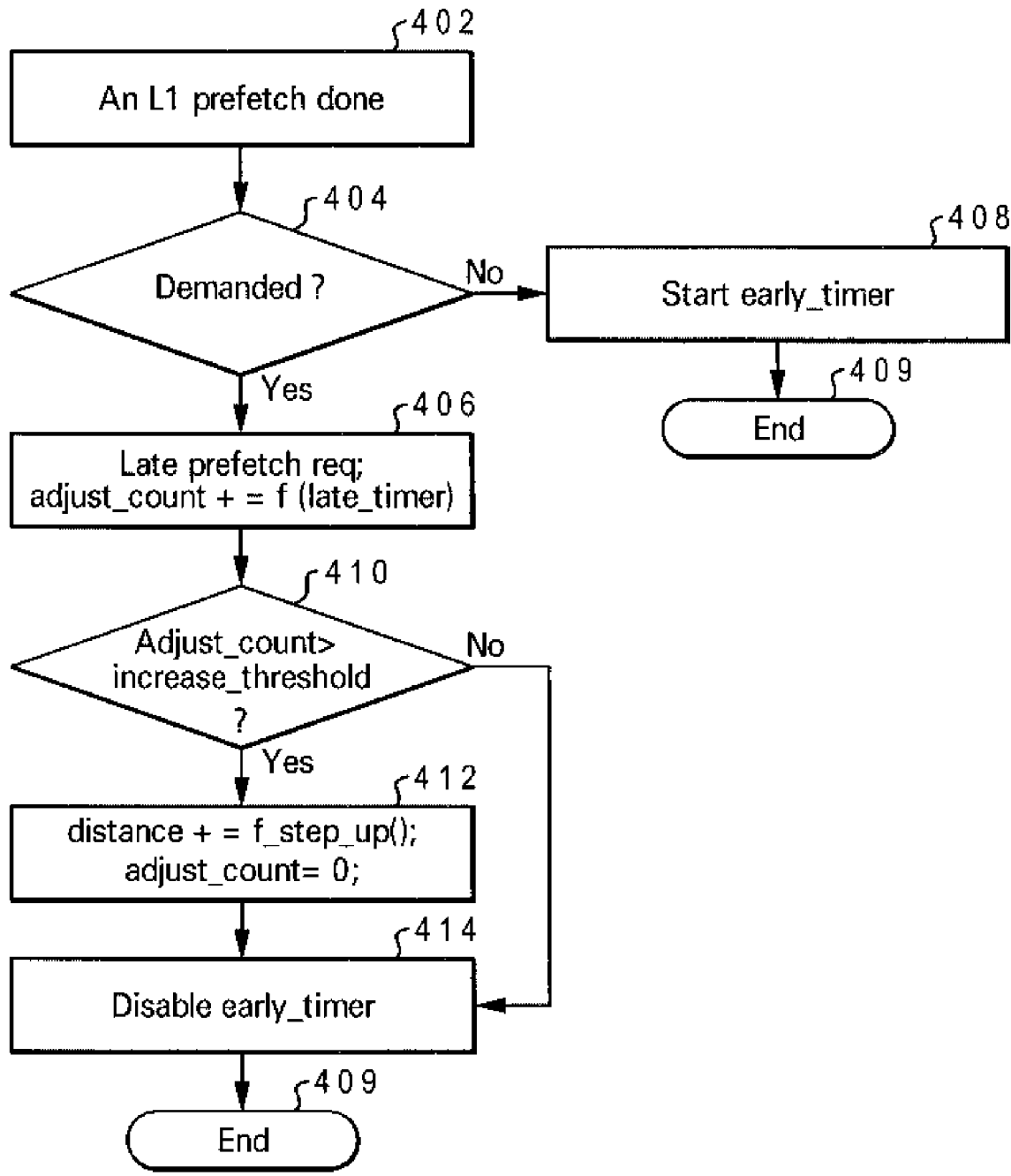
FIGS. 4A and 4B are high level logical flowcharts of the processes for completing dynamic adjustments to the prefetch distance to enable just-in-time prefetching, in accordance with one embodiment of the present invention.
Figure 4B:
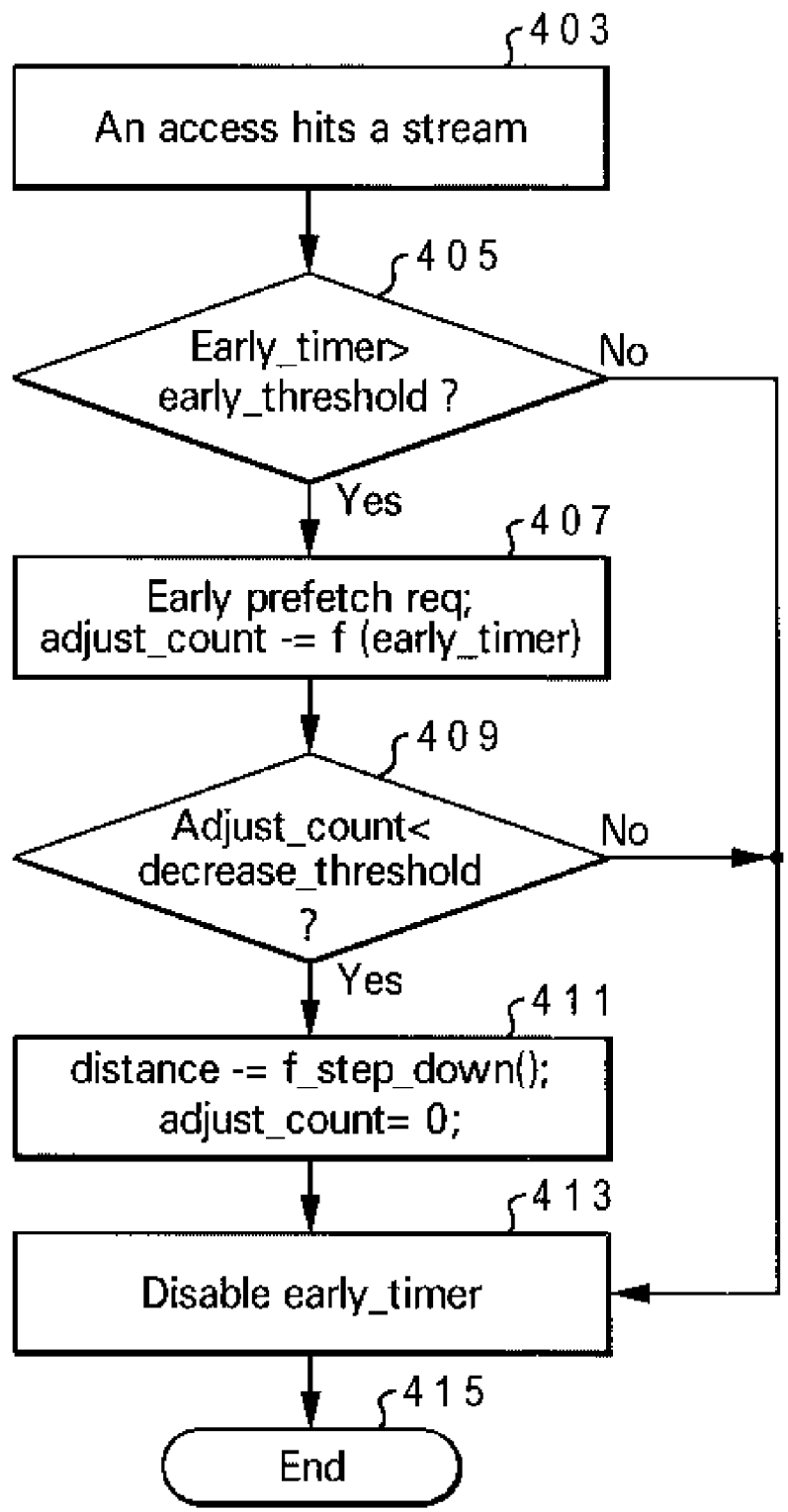

With specific reference now to FIGS. 4A and 4B, which depict high level flow charts of the processing undertaken by the enhanced prefetch logic to enable dynamic, calculated adjustments to the prefetch distance utilized by the PE to enable just-in-time data prefetching. In the described embodiment, the dynamic functionality provided by enhanced prefetch logic 223 may be provided via JITP utility, which comprises state machines executed within PE 120 to implement the dynamic adjustment process/algorithm, as described herein.

FIGS. 4A and 4B respectively illustrate the process by which the prefetch distance is increased and the process by which the prefetch distance is decreased. As shown by the legend associated with both figures, when the processor initially begins processing data, the initial values of both adjust_count and early_timer of the stream are set to zero (0).

As program execution proceeds, the PE 120 detects a prefetch stream and issues a prefetch request for the next cache line to a lower level memory location, such as the L2 cache. This data is returned and stored in the data cache and prefetch buffer 115. A later, associated load instruction directs the CPU 110 to load data into a processor register for further manipulation of the data by the CPU's execution units. Ideally, since the load instruction is preceded by an associated prefetch request, the prefetch has completed bringing the required data up to the data cache and prefetch buffer 115 so that the load is more quickly processed/executed.

Whenever a miss pattern within the data cache and prefetch buffer 115 is detected, a stream entry is established in the PE 120, which initiates a set of prefetches for the following cache lines in the prefetch stream. A stream may also be initiated through a set of special instructions issued by software. According to the invention, the time at which the prefetch requests are issued from the PE 120 depends on the results of the processes of FIGS. 4A and 4B.

In FIG. 4A, which depicts the process by which the prefetch distance may be increased by the JITP utility, the process begins at block 402 at which an L1 cache prefetch request is issued. When a prefetch request is issued, a typical cache, such as the data cache and prefetch buffer 115 (or L1 cache in PowerPC™ architecture), keeps a record of this prefetch request. When the processor later issues a demand access for the same cache line before the prefetch request returns (with the cache line), issuance of this demand prior to completion of the prefetch indicates that the prefetch distance is too short. Within the illustrative embodiment, a demand access received before completion of the data prefetch operation is merged into the prefetch request.

Returning to the figure, at block 404, prefetch logic monitors/determines if a demand targeting the same cache line as the issued prefetch request is received before the prefetch returns the cache line. Whenever the prefetch request returns, the PE 120 is informed of whether or not a demand access has been merged to the prefetch request. If the demand does not occur before the prefetch returns, i.e, the cache line is returned before the demand is issued by the CPU 110, then the JITP utility resets/restarts the process of determining whether the prefetch distance should be incremented, and the PE 120 starts tracking early_timer parameter for the corresponding stream, as shown at block 408.

However, if the demand does occur before the prefetch returns, a late prefetch is detected, and the PE 120 increments "adjust_count" by the pre-established increment value (e.g., 1), as shown at block 406. Then, at block 410, the PE 120 checks the new value of adjust_count to determine if the increment made adjust_count greater than the pre-established increase_threshold parameter. If the value of adjust_count is greater than the increase_threshold, the prefetch distance is increased by a pre-determined step_up_size, as shown at block 412. Then the early_timer is reset/disabled, as indicated at block 414.

Referring now to FIG. 4B, which illustrates the process for determining when to decrease the prefetch distance. Notably, the processes of FIGS. 4A and 4B are executed simultaneously by the PE 120 but illustrated as separate processes herein to distinguish the processes from each other. This distinguishing of processes enables one process to be implemented/executed separate from the other, since it is conceivable that a processor may be designed to correct only late prefetches or only early prefetches and thus implement only the respective branch of the two processes.

The process of FIG. 4B begins a block 403, which shows a demand access hitting a prefetch stream. At block 405, the PE 120 first checks if early_timer is active (i.e., the elapsed time between completion of the prefetch and receipt of the current demand) and has a value larger than early_threshold. If the value of early_timer is larger than early_threshold, an early prefetch is detected and the PE 120 decrements adjust_count by the pre-established decrement value (e.g., 1), as shown at block 407. Then, at block 409, a next determination is made whether the decrement makes "adjust_count" less than the preset decrease_threshold. If the value of adjust_count is determined to be less than decrease_threshold, the prefetch distance is decreased by the predetermined step_down_size, as shown at block 411. Otherwise, the early_timer parameter is disabled, as shown at block 414.

Actual implementation measures to improve the outcome of the above processes include beginning with a small prefetch distance, which provides a smaller misprediction penalty and also avoids unnecessarily early prefetches. Then, as the prefetching process continues, the algorithm ramps up the distance dynamically after a preset number of prefetches are late. Alternatively, if a preset number of prefetches are early, the algorithm ramps down the distance dynamically. The ultimate goal of the algorithm and the invention is to prevent or substantially minimize both late and early prefetches and incur a minimum amount of mis-prediction penalty.

In alternative embodiments, the prefetch distances for each level cache (i.e., L1, L2) may be tracked and adjusted independently or correlatively. In another implementation, separate counters are utilized for ramping up and ramping down. Further, in yet another embodiment, the PE 120 first checks a window of requests before making decisions about ramping up and/or ramping down.

Figure 5:
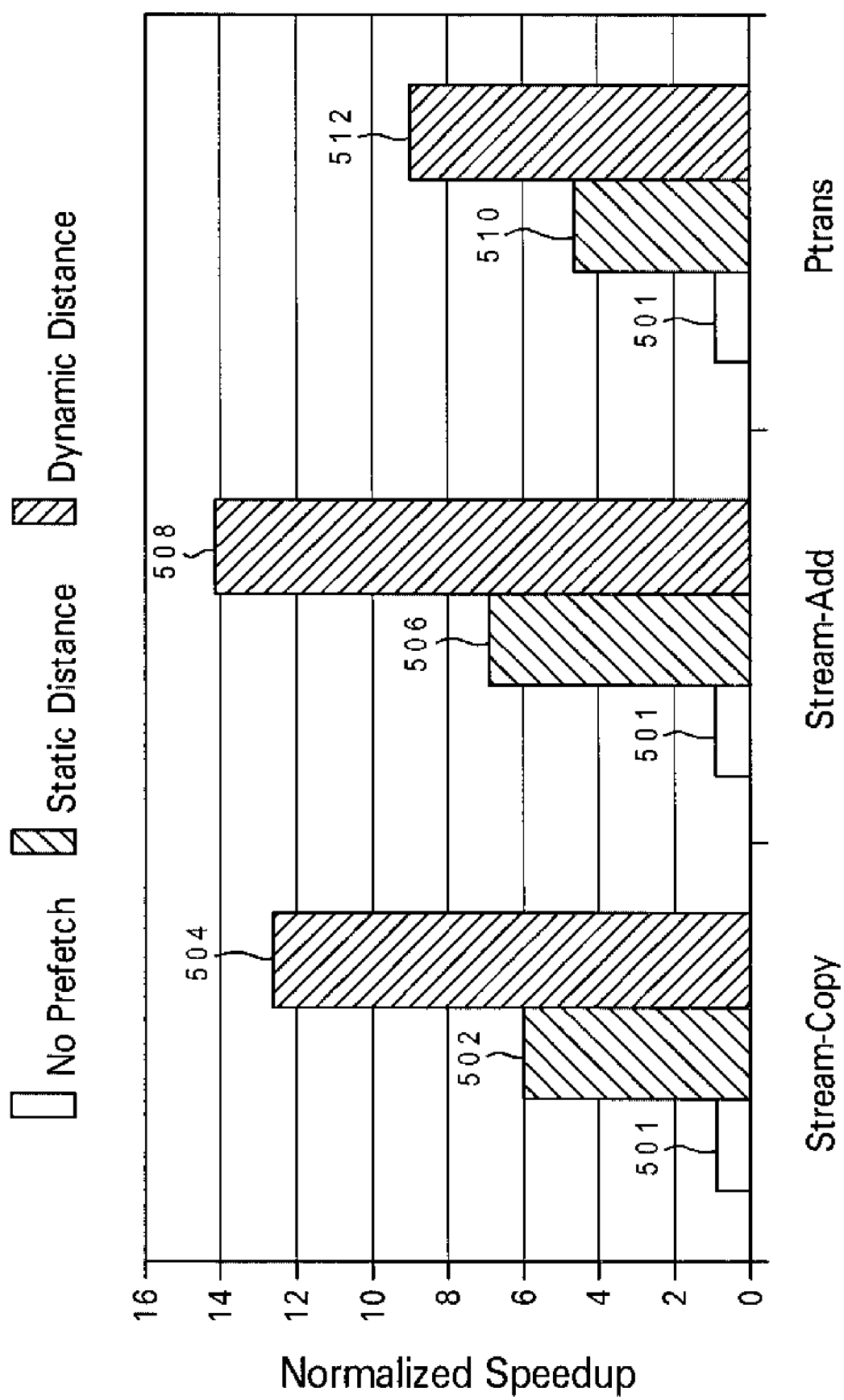
FIG. 5 is a chart showing the execution speed comparison between conventional static prefetching techniques and the dynamic prefetching techniques provided by the enhanced PE, in accordance with one embodiment of the present invention.

FIG. 5 illustrates a chart displaying the results of a prefetch performed at an L2 cache, utilizing the following parameter values: prefetch distance=[8, 64]; early_threshold=1000; increase_threshold=2; decrease_threshold=−4; L2 step_up_size=1; and step_down_size=1. With this set of parameter settings, the JITP utility generated results provided within the chart. The chart graphs the speed of both STREAM and PTRANS for a static implementation and a dynamic implementation, which is based on the present invention. Specifically, the chart indicates resulting STREAM plot 504 and PTRANS plot 508 of the dynamically adjustable prefetch distance next to respective conventional STREAM plot 502 and PTRANS plot 506 using a static distance. As shown, implementation of the features of the present invention (namely the enhanced PE logic and corresponding JITP utility) speeds up the STREAM and PTRANS benchmarks by a factor of approximately two, compared to the static implementation.

It is important to note that although the present invention has been described in the context of a data processing system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or compact discs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A data processing system comprising:
    a processor;
    a memory hierarchy coupled to the processor and comprising a data cache and prefetch buffer (DCPB) and at least one lower level storage device;
    wherein said DCPB comprises a load miss queue (LMQ), which includes a register for tracking a lateness interval; and
    a prefetch engine (PE) associated with the processor and comprising logic for:
        issuing prefetch requests for prefetching data from the at least one lower level storage device for utilization by the processor;
        saving an identifier (ID) of an ongoing prefetch within the LMQ, wherein said LMQ tracks when an ongoing prefetch is late via the lateness interval, which represents an interval between the issuance of the corresponding prefetch request until when the ongoing prefetch completes and the cache line is returned; and
        dynamically adjusting a prefetch distance between issuance of the prefetch request and issuance by the processor of a demand for a cache line being returned by the prefetch request so that a subsequent cache line within a prefetch stream is returned via a next issued prefetched request at effectively the same time a demand for data within that subsequent cache line is issued by the processor.

2. The data processing system of claim 1, wherein said PE further comprises logic for:
    adding a first field and a second field to a control structure of each prefetch stream, whereby an earliness tracking is completed on a per-stream basis;
    wherein the first field records the number of late/early prefetches for the particular stream and the second field tracks the time elapsed between return/completion of the data prefetch and when the prefetched data/cache line is demanded/requested by the processor;
    presetting a value of the first field to a normalized value for the stream, at which no adjustment would be required to the prefetch distance;

dynamically updating the value of the first field after each late prefetch, by increasing the value by a preset increment;

dynamically updating the value of the first field after each early prefetch by decreasing the value by a preset decrement.

3. The data processing system of claim 1, wherein said prefetch engine further comprises:

a plurality of registers within an active streams table, which registers are utilized to track when to adjust the prefetch distance.

4. The data processing system of claim 1, wherein said prefetch engine further comprises logic for completing the dynamically adjusting based on an analysis of current operating conditions from among:

(a) a prefetch return latency;
(b) time of issuance of a corresponding demand;
(c) a calculated prefetch distance;
(d) a load miss status of the DCPB; and
(e) values of a plurality of pre-established parameters utilized by a prefetch utility within the PE.

5. The data processing system of claim 1, wherein said prefetch engine further comprises:

logic for tracking per-stream late and early prefetch requests;

logic for executing an algorithm which adjusts the prefetch distance, said algorithm comprising processes operating with a plurality of adjustable and preset parameters from among:

a first (early) parameter that indicates a minimum number of elapsed cycles before a demand is received to consider a data prefetch early, a second (increase) parameter representing a minimum number of late prefetches recorded to initiate increasing the prefetch distance, a third (decrease) parameter representing a minimum number of early prefetches recorded to initiate decreasing the prefetch distance; a fourth (step_up) parameter representing a step-up size utilized when increasing the prefetch distance; and a fifth (step_down) parameter representing a step_down size utilized when decreasing the prefetch distance.

6. The data processing system of claim 5, wherein said processes provided by execution of said algorithm comprise:

detecting a prefetch stream and issuing a prefetch request for the next cache line to the lower level storage location;

recording the ID of the issued prefetch request within the LMQ;

when the cache line is returned before a demand is issued by the processor for the cache line, triggering an increment process to restart such that the prefetch distance is not incremented, and initiate tracking the increase parameter for the corresponding stream.

7. The data processing system of claim 6, wherein said processes further comprise:

when the demand is issued before the prefetch returns the cache line:

dynamically incrementing the late parameter by the preset increment value to yield a resulting value;

comparing the resulting value against the pre-established increase parameter to determine whether the resulting value is greater than the pre-established increase parameter; and when the resulting value is greater than the increase parameter, automatically increasing the prefetch distance by the pre-determined step_up size and resetting the first parameter to the normalized value.

8. The data processing system of claim 6, wherein said processes provided by execution of said algorithm further comprise:

when the demand is issued more than a preset number of cycles after the prefetch returns the cache line, determining whether the second parameter is active with a value larger than the early parameter; and when the value of the second parameter is larger than that of the early parameter:

dynamically decrementing the first (early) parameter by the pre-established decrement value to yield a next resulting value;

comparing the next resulting value against the decrease parameter to determine whether the next resulting value is less than the decrease parameter; and when the next resulting value is less than the decrease parameter, automatically decreasing the prefetch distance by the predetermined step_down size.

9. In data processing system comprising a processor, a prefetch engine, and a memory hierarchy having at least one cache and at least one lower level memory component, a method comprising:

issuing a prefetch request to fetch a cache line of data from the at least one lower level memory component;

monitoring a time between the issuance of the prefetch request and the occurrence of at least one trigger event from among:

(a) a receipt of a processor demand for the cache line before a completion of the prefetch request;
(b) a completion of the prefetch request and associated return of the cache line; and
(c) a receipt of the processor demand more than a pre-established minimum time after completion of the prefetch request;

when the trigger event is the receipt of the processor demand before the completion of the prefetch request, dynamically increasing a value of a first parameter, wherein the first parameter controls a time for issuing a next prefetch request for a next cache line within a stream of data cache lines so that the next prefetch request completes at effectively the time at which a subsequently-issued processor demand targeting the next cache line is received.

10. The method of claim 9, further comprising:

when the trigger event is the completion of the prefetch request more than the pre-established minimum time before the demand is received for that cache line, dynamically decreasing the value of the first parameter.

11. The method of claim 10, wherein:

the dynamically increasing the first parameter increases the first parameter by a preset increment; and the dynamically decreasing the first parameter decreases the first parameter by a preset decrement.

12. The method of claim 9, further comprising:

adding a first field and a second field to a control structure of each prefetch stream, whereby an earliness tracking is completed on a per-stream basis;

wherein the first field records the number of late/early prefetches for the particular stream and the second field tracks the time elapsed between return/completion of the data prefetch and when the prefetched data/cache line is demanded/requested by the processor;

presetting a value of the first field to a normalized value for the stream, at which no adjustment would be required to the prefetch distance;

dynamically updating the value of the first field after each late prefetch, by increasing the value by a preset increment;

dynamically updating the value of the first field after each early prefetch by decreasing the value by a preset decrement.

13. The method of claim 9, wherein the at least one cache comprises a load miss queue (LMQ), which comprises a register for tracking a lateness interval, said method further comprising:

saving an identifier (ID) of an ongoing prefetch within the LMQ, wherein said LMQ tracks when an ongoing prefetch is late via the lateness interval, which represents an interval between the issuance of the corresponding prefetch request until when the ongoing prefetch completes and the cache line is returned.

14. The method of claim 9, wherein said dynamically adjusting further comprises completing the dynamically adjusting based on an analysis of current operating conditions from among:

(a) a prefetch return latency;
(b) time of issuance of a corresponding demand;
(c) a calculated prefetch distance;
(d) a load miss status of the DCPB; and (e) values of a plurality of pre-established parameters utilized by a prefetch utility within the PE.

15. The method of claim 9, further comprising:

tracking per-stream late and early prefetch requests;

executing an algorithm which adjusts the prefetch distance, said algorithm comprising processes operating with a plurality of adjustable and preset parameters from among:

a first (early) parameter that indicates a minimum number of elapsed cycles before a demand is received to consider a data prefetch early, a second (increase) parameter representing a minimum number of late prefetches recorded to initiate increasing the prefetch distance, a third (decrease) parameter representing a minimum number of early prefetches recorded to initiate decreasing the prefetch distance; a fourth (step_up) parameter representing a step-up size utilized when increasing the prefetch distance; and a fifth (step_down) parameter representing a step_down size utilized when decreasing the prefetch distance.

16. The method of claim 15, further comprising:

detecting a prefetch stream and issuing a prefetch request for the next cache line to the lower level storage location;

recording the ID of the issued prefetch request within the LMQ;

when the cache line is returned before a demand is issued by the processor for the cache line, triggering an increment process to restart such that the prefetch distance is not incremented, and initiate tracking the increase parameter for the corresponding stream.

17. The method of claim 16, further comprising:

when the demand is issued before the prefetch returns the cache line:

dynamically incrementing the early parameter by the preset increment value to yield a resulting value;

comparing the resulting value against the pre-established increase parameter to determine whether the resulting value is greater than the pre-established increase parameter; and when the resulting value is greater than the increase parameter, automatically increasing the prefetch distance by the pre-determined step_up size and resetting the first parameter to the normalized value.

18. The method of claim 16, further comprising:

when the demand is issued more than a preset number of cycles before the prefetch returns the cache line, determining whether the second parameter is active with a value larger than the early parameter; and when the value of the second parameter is larger than that of the early parameter:

dynamically decrementing the first (early) parameter by the pre-established decrement value to yield a next resulting value;

comparing the next resulting value against the decrease parameter to determine whether the next resulting value is less than the decrease parameter; and when the next resulting value is less than the decrease parameter, automatically decreasing the prefetch distance by the predetermined step_down size.

19. A computer program product comprising a recordable type medium; and program code on the recordable type medium that when executed provides the functions of claim 9.

20. A computer program product comprising:

a recordable type medium; and program code on the recordable type medium that when executed provides the functions of:

tracking per-stream late and early prefetch requests;

executing an algorithm which adjusts the prefetch distance, said algorithm comprising processes operating with a plurality of adjustable and preset parameters from among: a first (early) parameter that indicates a minimum number of elapsed cycles before a demand is received to consider a prefetch early, a second (increase) parameter representing a minimum number of late prefetches recorded to initiate increasing the prefetch distance, a third (decrease) parameter representing a minimum number of early prefetches recorded to initiate decreasing the prefetch distance; a fourth (step_up) parameter representing a step-up size utilized when increasing the prefetch distance; and a fifth (step_down) parameter representing a step_down size utilized when decreasing the prefetch distance;

detecting a prefetch stream and issuing a prefetch request for the next cache line to the lower level storage location;

recording the identifier (ID) of the issued prefetch request within the load/miss queue (LMQ);

when the cache line is returned before a demand is issued by the processor for the cache line, triggering an increment process to restart such that the prefetch distance is not incremented, and initiate tracking the increase parameter for the corresponding stream;

when the demand is issued before the prefetch returns the cache line:

dynamically incrementing the early parameter by the preset increment value to yield a resulting value;

comparing the resulting value against the pre-established increase parameter to determine whether the resulting value is greater than the pre-established increase parameter; and when the resulting value is greater than the increase parameter, automatically increasing the prefetch distance by the pre-determined step_up size and resetting the first parameter to the normalized value;

when the demand is issued more than a preset number of cycles before the prefetch returns the cache line, determining whether the second parameter is active with a value larger than the early parameter; and when the value of the second parameter is larger than that of the early parameter: dynamically decrementing the first (early) parameter by the pre-established decrement value to yield a next resulting value;

comparing the next resulting value against the decrease parameter to determine whether the next resulting value is less than the decrease parameter; and when the next resulting value is less than the decrease parameter, automatically decreasing the prefetch distance by the predetermined step_down size.

* * * * *